United States Patent [19]
Fee et al.

[11] Patent Number: 5,726,788
[45] Date of Patent: Mar. 10, 1998

[54] DYNAMICALLY RECONFIGURABLE OPTICAL INTERFACE DEVICE USING AN OPTICALLY SWITCHED BACKPLANE

[75] Inventors: John A. Fee, Plano; Shoa-Kai Liu, Richardson; Andrew Niall Robinson; Reddy Urimindi, both of Plano, all of Tex.

[73] Assignee: MCI Corporation, Washington, D.C.

[21] Appl. No.: 720,477

[22] Filed: Sep. 30, 1996

[51] Int. Cl.$^6$ .......................... H04B 10/00; H04J 14/08
[52] U.S. Cl. .......................... 359/163; 359/118; 359/139; 359/128; 370/360
[58] Field of Search .......................... 359/117–118, 128, 359/134, 139, 160, 163, 123, 179; 370/351, 360, 386, 429

[56] References Cited

PUBLICATIONS

Robinson et al., "Performance of an optical backplane bus for switch interconnection", IEE Proc.–Optoelectron., vol. 143, No. 4, Aug. 1996.
Robinson et al., "The Optical Backplane Bus As The Interconnection Network of A Switch", IEE, 1995.

*Primary Examiner*—Kinfe-Michael Negash

[57] ABSTRACT

An optical interface device dynamically reconfigures a telecommunications network. The device includes an optically switched backplane connected between two stages of an optical tapped amplifier. Various modules may be plugged into the backplane for performing selective processing of the optical signal without any signal conversion to electrical domain. The modules are electrically controlled by a controller, which is also a module, overseeing the operations upon the optical signal by other modules.

11 Claims, 7 Drawing Sheets

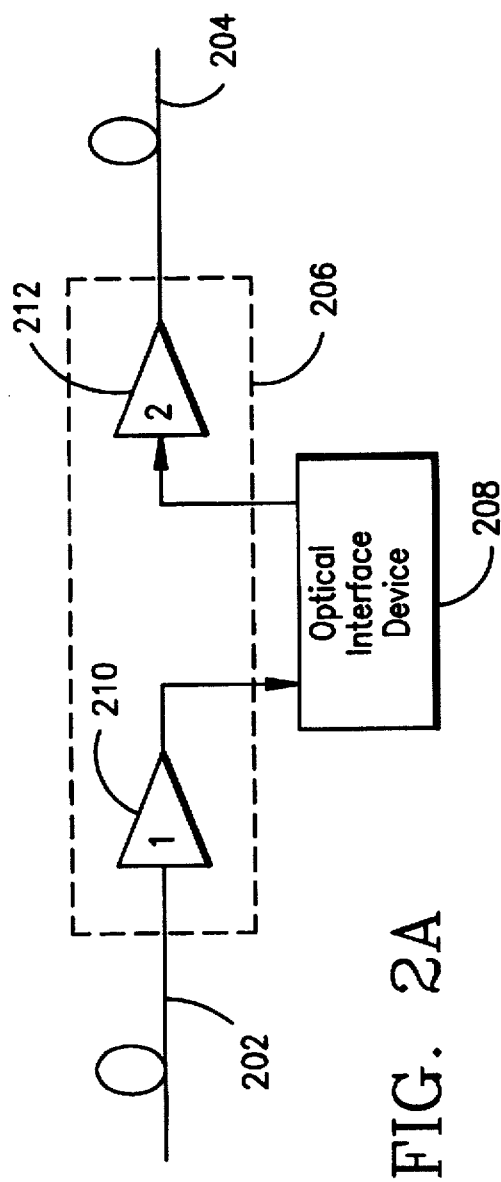
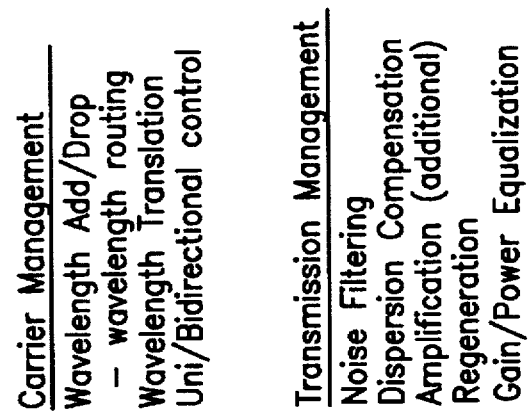
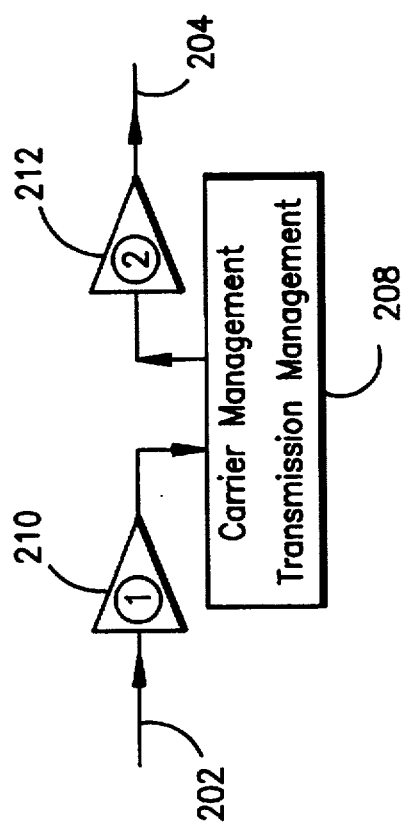
FIG. 2A
FIG. 2B

1x2 Switch

1x4 Switch

4x4 Switch

DYNAMICALLY RECONFIGURABLE OPTICAL INTERFACE DEVICE USING AN OPTICALLY SWITCHED BACKPLANE

FIELD OF THE INVENTION

This invention relates to an optical telecommunications network and, in particular, a device and method for easily controlling various optical telecommunications functions, such as signal switching or amplification, in a non-homogeneous environment and for providing a flexible, on-demand reconfiguration of an optical telecommunications network.

BACKGROUND OF THE INVENTION

A communications network transports information among a number of locations. The information is usually presented to the network in the form of time-domain electrical signals and may represent any combination of telephony, video, or computer data in a variety of formats. To transport such information, a typical communications network consists of various physical sites (nodes) and information conduits (links) that interconnect the nodes. Each link carries information between nodes, while each node may contain equipment for combining, separating, transforming, conditioning, and routing the information signals.

As an example, FIG. 1 shows a typical communications network 100 comprising nodes 101–105 which are connected by links, such as 120–121. The communications system 100 routes data to effectively interconnect data equipment 111–115 located at a distance from one another. This routing is accomplished within the network by the ability of each node to perform a switching function, that is, to accept data entering along one link and send the data out along a different link. Under normal circumstances, the switching within each node is controlled by some overall network routing logic. An example of a typical commercially available switch that can serve as node 101 is the Model 1633-SX Digital Cross-Connect Switch manufactured by Alcatel Network Systems.

Nodes are typically connected by many parallel links due to the need for capacity. In addition, redundant spare links are commonly added between nodes: spare links usually carry no data traffic but may be used as alternate routes in the event of a partial network failure. This spare link capacity, coupled with the switching ability within the network nodes, allows the network to use re-routing to recover from partial failures by circumventing the failed network elements.

While links in a network are currently implemented as electrical cables or RF signals, either analog or digital, recent significant developments in optical transmission elements, such as lasers, optical fibers, etc., enable network owners to replace or augment existing radio and cable links. The main advantage of the optical transmission is extremely high modulation bandwidth of the optical carrier—orders of magnitude greater than with an electrical cable or microwave links. Thus, a present day optical carrier may be modulated with multi-gigabit-per-second data representing, for example, over 150,000 simultaneous telephone voice signals. Other significant advantages of the optical transmission are low attenuation, immunity to electrical noise, and relatively good security of the transmitted signal.

Although optical communications are undoubtedly superior to other existing forms of communication, the pursuit of the all-optical network poses some unique new challenges. For example, even if an optical signal can pass end-to-end through a network without a transformation to an electrical domain, there is an issue of compatibility between a signal and the light pathways in the network. That is, the fibers that form links in a network may have different composition and be incompatible with each other with respect to the optical signal propagation. It is possible that some of the older fibers may not support certain wavelengths, bandwidths, or optical power levels. Certain operations, such as wavelength translation or conditioning, would be required to enable propagation of the light signal through the network.

Furthermore, an all-optical path requires various regenerative elements, such as optical or lightwave amplifiers, to strengthen the signal along its path, as known in the art. These amplifiers may be sensitive to various wavelengths and modulated payloads (modulated information signal). The difference in optical amplifiers would necessitate an appropriate signal conditioning to transmit a signal via an optical network.

In addition, while optical switching represented by an optical cross-connect switch is becoming commercially available with ever-improving capabilities and is similar to an electrical domain Digital Cross-Connect Switch, it is still lacking behind in flexibility and control offered by electrical signal processing. While the control of such operations as signal multiplexing/demultiplexing, selective add/drop of signals, etc. is well established for the electrical switching, the automatic and intelligent management of corresponding optical operations is practically non-existent in an all-optical telecommunications network. These considerations become particularly important and challenging with respect to restorative operations, where intelligent decisions must be made quickly in order to bypass the malfunctioning equipment and re-route signals within the all-optical network.

A need, therefore, exists for an optical device for selectively amplifying, switching, regenerating and performing other signal processing operations upon an optical signal. This device must handle diverse optical signals, payloads, and signal processing functions. Due to the necessity of sudden restorative switch-over as an example, this optical unit must also be dynamically reconfigurable to accommodate any of the signals and situations likely to be encountered in a telecommunications network.

SUMMARY OF THE INVENTION

It is therefore an object of the invention to be able to easily control the processing of any optical signal in a telecommunications network.

It is another object of the invention to be able to quickly select a processing operation for any optical signal in a telecommunications network.

It is yet another object of the invention to be able to dynamically reconfigure an optical telecommunications network in case of partial failure.

These and other objects, features and advantages are accomplished by an optical interface device for dynamically reconfiguring a telecommunications network. The inventive device includes an optical amplifier with two stages for amplifying an information carrying optical signal in a communications conduit within the telecommunications network. An optical switch backplane is communicatively coupled between the two stages and includes optical ports through which the signal is selectively passed. A processing function is connected via the ports to the optical switch backplane for receiving the signal and then transmitting it back to the optical switch backplane after a predetermined processing operation. A controller, including a microprocessor, is electrically connected to the optical switch backplane for controlling via electrical signals the processing operation of the function.

In accordance with one aspect of the present invention, a non-volatile storage device is connected to the controller for storing routing logic computer program instructions used by the controller. The instructions are accessed by the controller if a power is interrupted thereto.

In accordance with another aspect of the present invention, the optical switch backplane includes at least one-by-two switching unit. The switching unit has one input port and two output ports for selectively routing the signal from the input port to any of the two output ports. The one-by-two switching unit may be cascaded with at least one other one-by-two switching unit: this results in a multiple input/multiple output switching unit which selectively routes the signal among the processing functions.

BRIEF DESCRIPTION OF THE DRAWINGS

The above-mentioned as well as additional advantages and features of the present invention will be evident and more clearly understood when considered in conjunction with the accompanying drawings, in which:

FIG. 2A shows a general overview of the present invention in block diagram form.

FIG. 2B shows a block diagram of several exemplary processing functions performed by the inventive device in accordance with the present invention.

In all Figures, like reference numerals represent same or identical components of the present invention.

DESCRIPTION OF THE PREFERRED EMBODIMENTS

Figure 1:
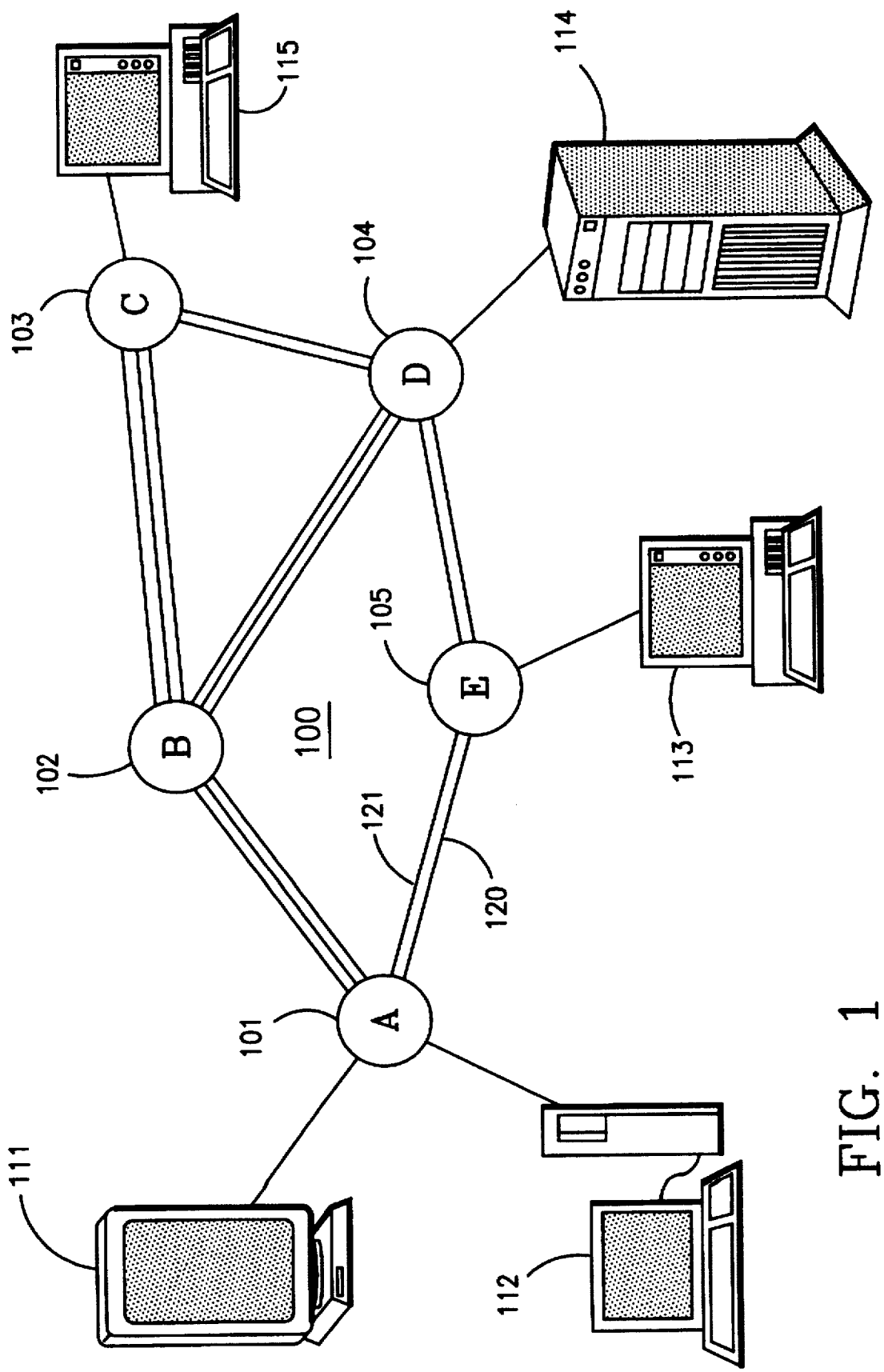
FIG. 1 shows a communications network having nodes connected by links for routing data between various elements of equipment located at the nodes.

To facilitate the understanding of the present invention, a general overview in block diagram form is shown in FIG. 2A. Fiber links 202 and 204 carry optical data to and from node 101, for example, of FIG. 1 to interconnect equipment 111 and 112 as previously stated. Prior to entering the node, a two stage tapped optical amplifier 206 boosts the signal for further processing by the signal processing functions as explained below. Input stage 1, designated as 210, amplifies the optical signal which is then processed by optical interface device 208. Similarly, upon leaving the node, the signal is again strengthened (amplified) by output stage 2, designated as 212, for subsequent transmission through link 204 to another node within the telecommunications network.

FIG. 2B shows several exemplary processing functions performed by optical interface device 208 located between the two stages 210 and 212 of the tapped amplifier. Thus, typical processing of the information carrying optical signal may include optical carrier management and transmission management. Carrier management comprises such exemplary functions as wavelength drop/add, wavelength routing, wavelength translation, uni/bi-directional control, etc. Some representative operations of the transmission management are noise filtering, dispersion compensation, additional amplification, regeneration, gain/power equalization, etc. Both carrier and transmission management operations in accordance with the present invention will be explained more fully below.

Figure 3:
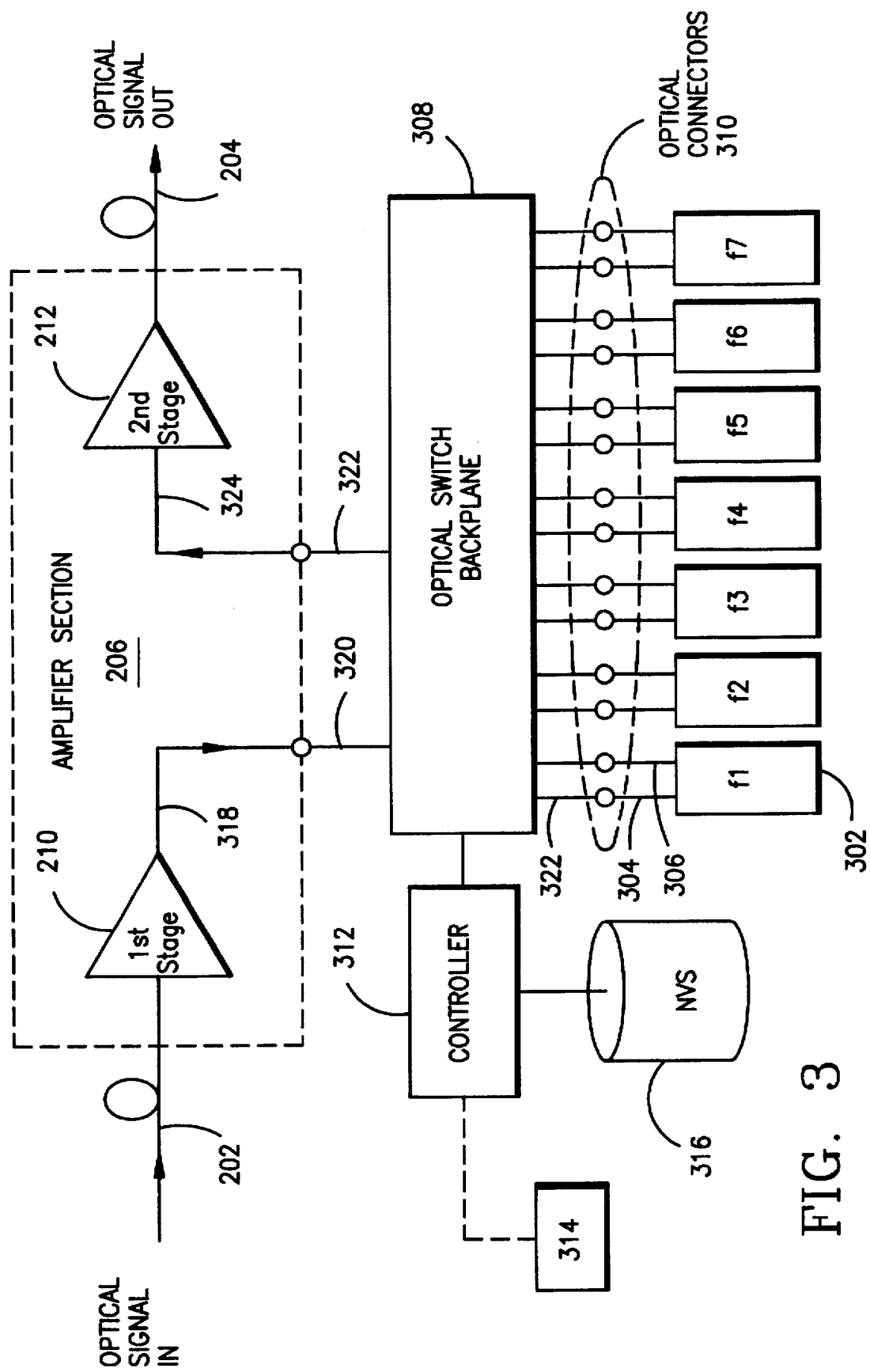
FIG. 3 shows a block diagram of an intelligent optical device in accordance with one embodiment of the present invention.

Next, a detailed block diagram of the intelligent optical interface device is illustrated in FIG. 3 in accordance with one embodiment of the present invention. As shown in the figure, the inventive device includes optical amplifier 206 with a tap provided between the two gain stages: input gain stage 210 and output gain stage 212. The optical gain stages 210, 212 may be implemented using doped fiber amplifiers or semiconductor amplifiers which are commercially available and known to skilled artisans. The tap allows for insertion of various processing operations, such as function f1 designated as 302 and functions f2-f7, to be performed upon the information carrying optical signal.

As stated earlier, the first gain stage 210 boosts the optical signal at the input of the amplifier: after propagating through a link leading to the node, the signal loses its energy and decreases in amplitude. Consequently, to preserve an operational signal-to-noise ratio, the signal is amplified prior to entering the optical functions f1-f7 which may further decrease the signal strength. The second gain stage 212 restores the optical signal to a functional transmit power level after the optical processing operations have been performed upon the signal by functions f1-f7.

A variety of possible optical functions f1-f7 are depicted in FIG. 3. Most of these functions typically have a single input 304 and single output 306, while wavelength multiplexors are a notable exception. The inputs and outputs 304, 306 from each function are connected to optical switch backplane 308 via optical connectors 310.

The following is a non-exclusive representative list of optical modules for processing information carrying optical signal:

Amplifier: amplifies optical signal using doped fiber or semiconductor amplification.

Wavelength reference generator: generates a stable optical output signal at a specific reference wavelength.

Dispersion compensator: counteracts the aberrational effects of a long fiber (i.e. velocity and polarization mode dispersion).

ASE filter: removes noise caused by amplification of spontaneous emission.

Pump Insertion: allows a strong laser signal to enter a doped fiber for amplification purposes.

Wavelength translator: shifts a wavelength of an optical signal.

Unidirectional/Bidirectional Converter: extracts and blends counter-propagating optical signals.

Wavelength separator/combiner: provides optical grating, or the like, for wavelength division multiplexing and/or demultiplexing.

Modulation reshaper: clarifies the modulation waveform and restores risetime/falltime/duration of the signal.

Add/drop ports: provide a simple tap to allow a drop/insert of optical signals and may even branch for network build-out.

Amplitude equalizer: adjusts the relative amplitude of several optical wavelengths due to uneven response of optical amplifiers.

Sub-carrier discriminator: extracts low-level, low-frequency sub-carrier superimposed on the optical signal.

Figure 4A:
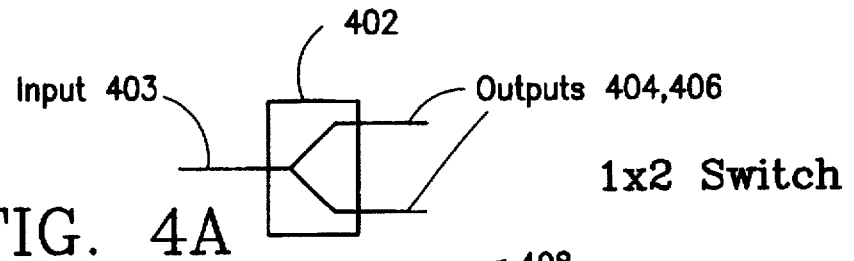
FIG. 4A shows a block diagram of an illustrative embodiment of a one-by-two basic optical switching unit.
Figure 4B:
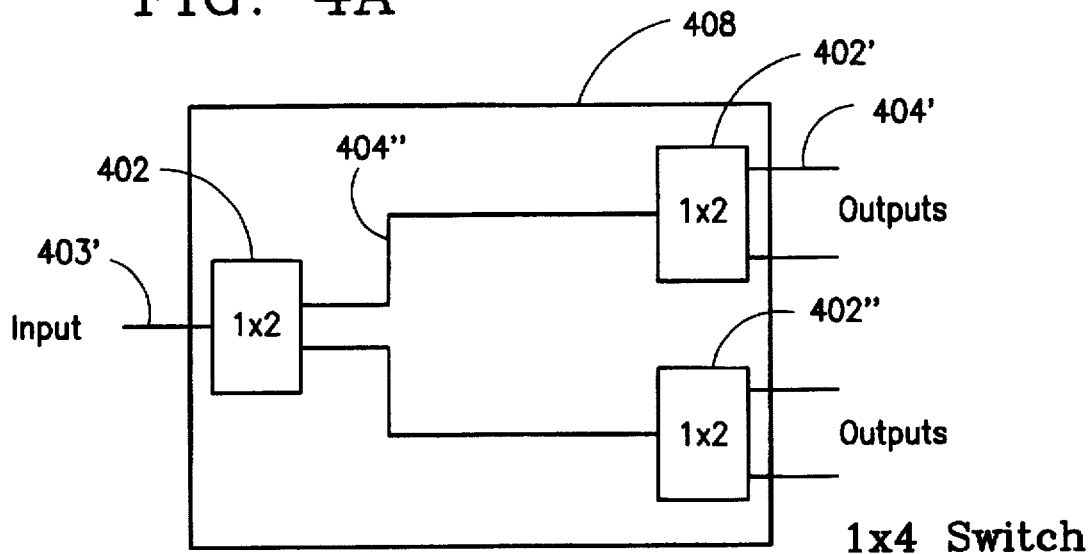
FIG. 4B shows a block diagram of a one-by-four optical switching unit built from three one-by-two units of FIG. 4A.
Figure 4C:
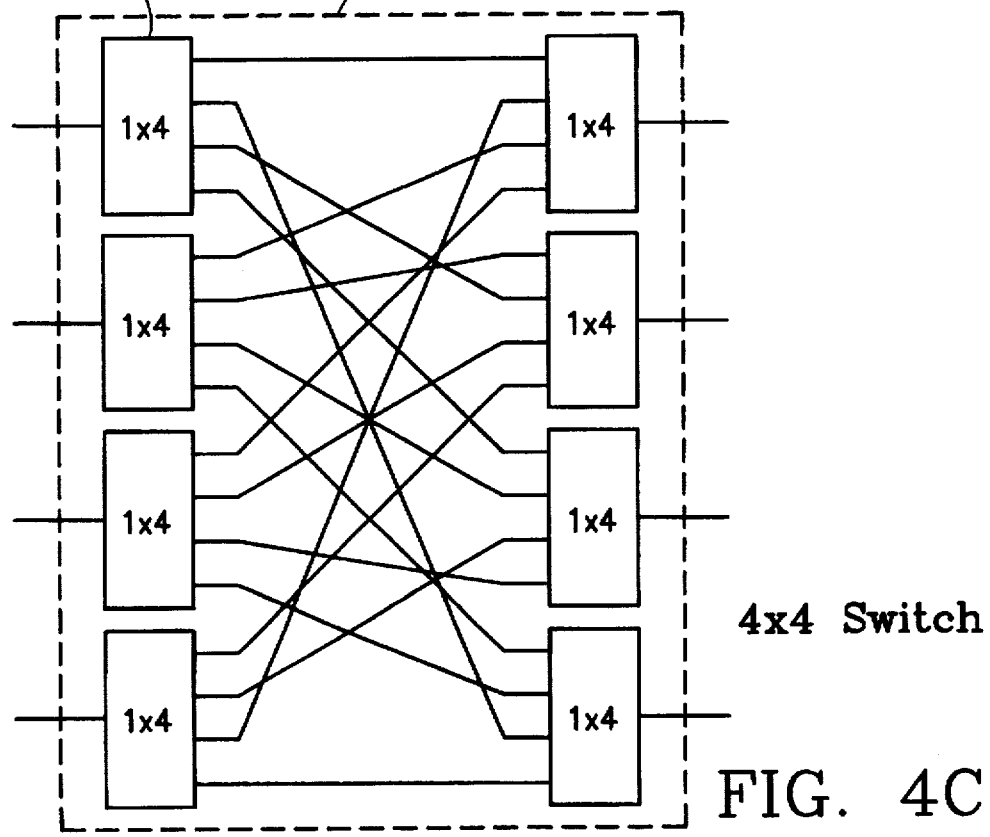
FIG. 4C shows a block diagram of a four-by-four optical switching unit built from eight one-by-four units of FIG. 4B.

The optical functions are inserted via the tap in amplifier 206 and are selected by the connections formed within optical switch backplane 308. Optical switch backplane 308 can connect an output of any function to the input of any another function attached to the backplane. FIGS. 4A–4C show one exemplary embodiment of optical switch backplane 308 implementing this flexible optical interconnectivity among the functions.

FIG. 4A shows the most basic unit, i.e., the building block, of an optical switch: a one-by-two switch 402 which has one input port 403 and a choice of two output ports 404, 406. This basic unit of the optical switch may employ an amplitude beam splitter, or any other technology as known to people skilled in the art.

To construct a one-by-four switching unit 408 with one input port and four output ports which you can choose from, three basic one-by-two units 402 are arranged as shown in FIG. 4B. Thus, one-by-four switching unit 408 incudes switch 402 at its input, and at each of the output ports of switch 402 another one-by-two switch 402', 402" is located to supply a choice of four output ports for the optical signal. So, if output port 404' of one-by-four switching unit 408 is desired, the optical signal enters—via input port 403'—one-by-two switch 402 which selects output port 404". The signal via output port 404" serves as input to one-by-two switch 402', which then selects output port 404'.

It is clear that multiple input/output switches may be built by cascading basic one-by-two switching blocks. FIG. 4C shows an exemplary four-by-four switch 410 with a choice of four input ports and four output ports. Eight one-by-four switches are employed: four on the input side and four on the output side. Each one-by-four switch comprises three one-by-two switches as shown in FIG. 4B and described above. In the exemplary four-by four switch 410, an optical shuffle network is performed: each output port of the one-by-four switch at the input side is connected to an input port of each one-by-four switch at the output side. Thus, any input can be switched to any of the four outputs. Similarly, an eight-by-eight switch, a sixteen-by-sixteen switch, etc. may be constructed by cascading multiple basic one-by-two switching units.

Returning to the description of FIG. 3, as merely an example, the signal from output port 318 of amplifier first stage 210 may go to input port 320 of a four-by-four switch of FIG. 4C in optical switch backplane 308. The optical signal can then be switched to any of the output ports 322 of optical switch backplane 308 routing the signal to any of the functions f1–f7 for the appropriate processing. The processed signal from a function is returned to optical switch backplane 308 and may then be reconnected to an input port of the four-by-four switch, for example, for further routing to another output port and processing by another function.

Clearly, once passed into optical switch backplane 308, the optical signal can be routed to any one of the functions f1–f7, either to one function or sequentially to multiple functions. Eventually after processing by the functions f1–f7, the signal may be either dropped or reinserted via output port 322 to input port 324 of amplifier second stage 212 for propagation via the main optical line, i.e., link 204. Obviously, optical switch backplane 308 can determine not only which functions are inserted in the optical path of the information carrying optical signal, but also in which order, i.e., how the signal is processed.

Continuing with the description of FIG. 3, further shown is controller 312 which controls the switching action within optical switch backplane 308. Controller 312 is an electrical device and adds the intelligence and flexibility to the processing operations performed upon the optical signal by functions f1–f7. Optical switch backplane 308 may be controlled by a remote centralized network control center 314 via an electrical cable or RF signal conduit. For example, in the course of restoration or provisioning, center 314 sends commands to controller 312 which then enables a redundant module or activates another module to re-route the signal within the network. Alternatively, modulated signals along the incoming optical carriers may convey commands to controller 312. This information can then contribute to a decision-making process by controller 312.

Controller 312 may not only receive commands to execute certain functions at the optical switching backplane, but may also notify a supervisory controller of changes in status or configuration. In addition, controller 312 may respond to queries regarding the present capabilities or module content of the optical unit.

FIG. 3 also shows a non-volatile storage device 316 attached to controller 312. Non-volatile storage device 316 holds the routing logic for controller 312 so that the configuration of optical switch backplane 308 can be quickly restored after a power failure, for example.

Figure 5:
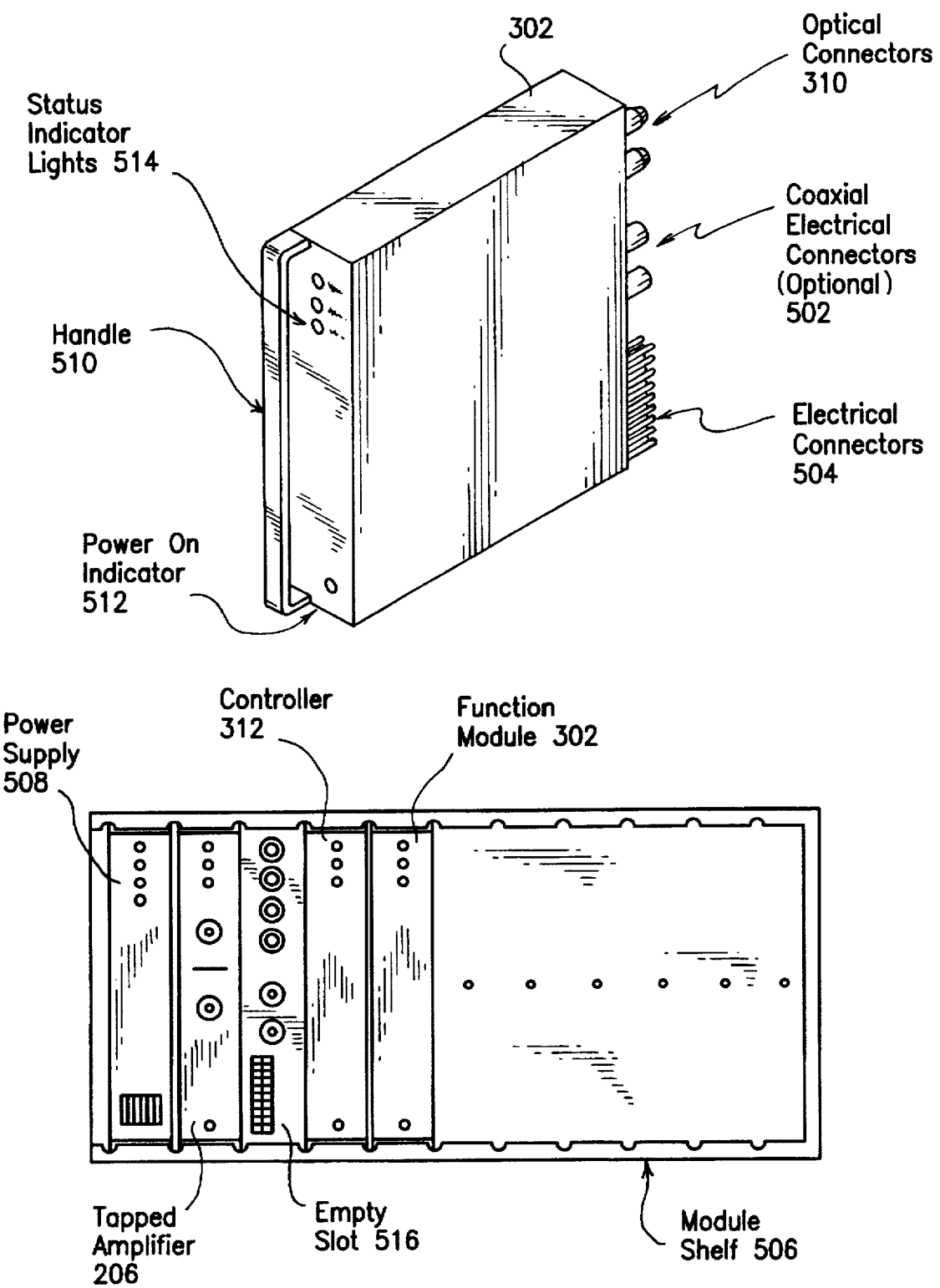
FIG. 5 shows a diagram of a shelve in a cabinet for the optical interface device, which contains a typical set of functional modules in accordance with one embodiment of the present invention.

In a practical implementation, amplifiers and various optical functions are shown as self-contained modules in FIG. 5. A representative module 302 is shaped as a rectangular, solid box containing handle 510 for transporting the module, as well as status indicator lights 514 and power-on indicator 512 on the front portion of the module. Lights 514 indicate the status of the module, i.e., whether it is currently in operation, etc. Similarly, power-on indicator 512 gives a visual indication whether the power is supplied to the module and whether the module is turned on.

The rear portion of the module has optical connectors 310 for attaching to corresponding optical connectors on module shelf 506. Coaxial electrical connectors 502 are optionally provided on module 302 so that electrical signals may be used for communication within the network in place of optical signals, if desired. Further provided is an electrical card edge connector 504. This multi-wire connector provides an electrical communications path between a corresponding module and controller 312: a microprocessor on controller 312 executes computer instructions either embedded in an internal on-chip microprocessor memory or external memory. The microprocessor controls the operation of the modules f1–f7 in optical switch backplane 308 by establishing communication via a predetermined protocol with a microprocessor in each individual module. Electrical signal are passed between the microprocessors along a multi-wire conduit (bus) into which each module plugs in using connector 504.

As further shown in FIG. 5, the modules fit into the shared shelf 506 in an equipment rack by plugging into optical switch backplane 308. As stated above, the modules have both electrical and optical connectors which plug into mating connectors in the back of the shelf. A representative empty slot 516 illustrates corresponding mating connectors for each module in shelf 506 which also contains power supply 508 and tapped amplifier 206. Both power supply 508 and amplifier 206 are designed and constructed as plug-in modules, which are similar to the function modules f1–f7.

Even though physical intervention may be required to change shelf contents, remote or automatic switching of optical switch backplane 308 provides flexibility which is currently enjoyed only by electrical-domain networks. A great deal of reconfigurability is possible to accommodate various optical signals or to allow remote changes of optical network configuration on the fly.

In addition, redundant modules may be inserted into the optical unit. The optical switch backplane can then perform the fail-over switching. That is, the re-routing of signals is automatically accomplished in the event of partial network failure.

Figure 6:
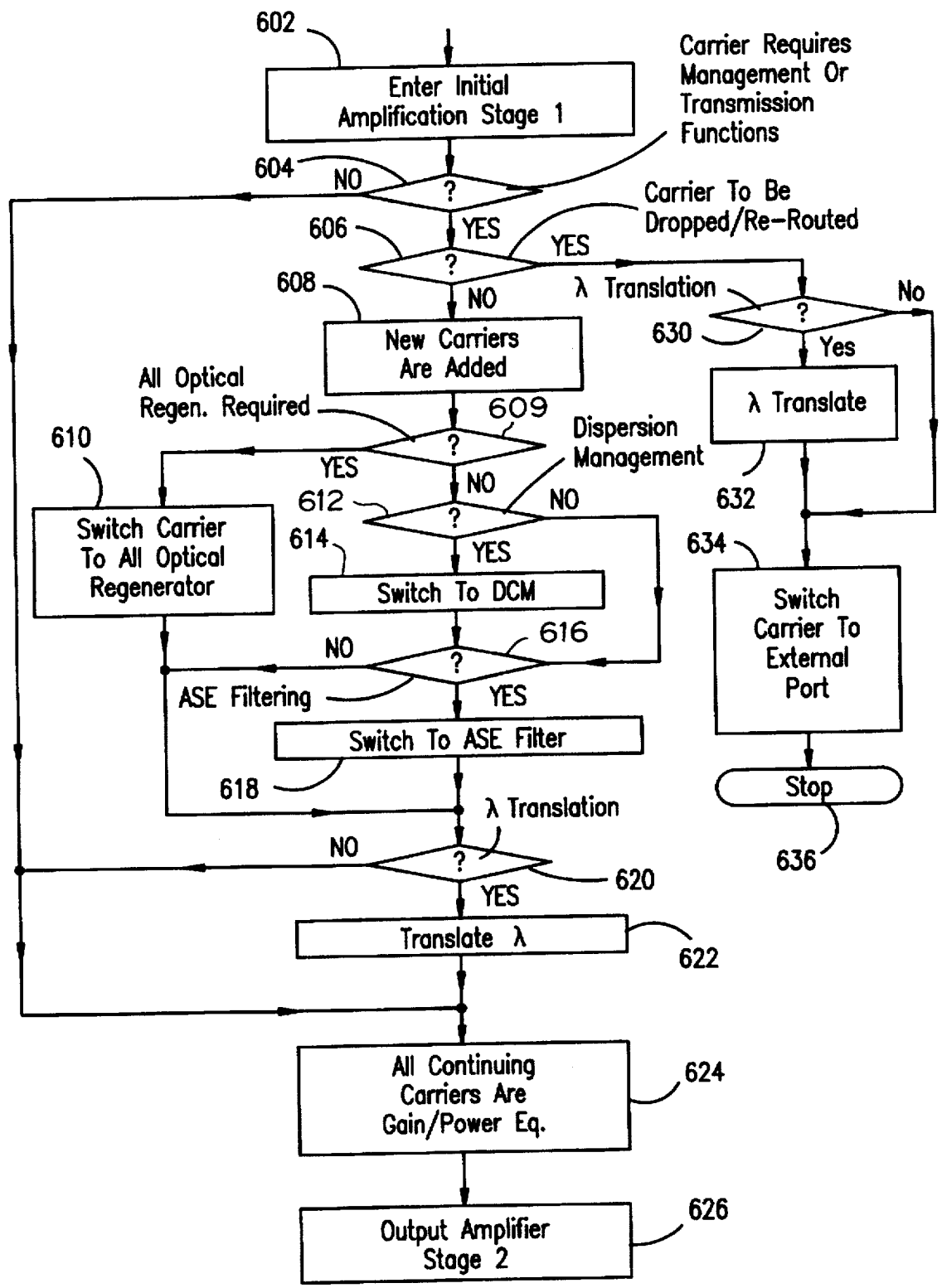
FIG. 6 is a sequencing flowchart of optical carrier and transmission management decisions carried out by the intelligent optical device in accordance with one embodiment of the present invention.

The flowchart of FIG. 6 shows representative steps that controller 312 might exercise in deciding how a given optical signal should be routed through the various functional modules installed in optical switch backplane 308. In particular, in step 602 the optical signal enters the initial amplification stage 210 of amplifier 206. A decision is then made in step 604 whether the optical carrier requires management or transmission functions. If so, another decision in step 606 is undertaken to determine if the optical carrier must be dropped or re-routed. If, however, no processing operations are to be performed, then in step 624 the carrier is gain and power equalized and directed to the second stage 212 of amplifier 206 in step 626 for subsequent transmission via link 204.

In step 608, if carrier is not dropped or re-routed, new optical carriers are added. Whether all optical regeneration is required is determined in step 609. If yes, all optical regeneration of the carrier is performed by the appropriate functional module in step 610, and if no, then another decision is made whether dispersion management is needed in step 612. If so, the dispersion compensator is activated to counteract the aberrational effects of a fiber in step 614.

In step 616, a determination is made whether ASE filtering is required and if so, the filtering function is activated to remove noise from the signal. A decision is then carried out in step 620 concerning the wavelength translation. If directed by the logic, the signal wavelength translation function is actuated in step 622, and the optical signal is further processed in steps 624 and 626 as previously described.

If in step 606, it is determined that the carrier must be either dropped or re-routed, a decision is carried out in step 630 whether to perform a wavelength translation. If so, the signal wavelength translation function is activated in step 632. Otherwise, the carrier is switched to external port, and the processing is terminated in step 636.

Decision steps 604, 606, 609, 612, 616, 620 and 630 require some knowledge about the particular needs of the input optical signal. In each of these steps, the decisions may be affected or influenced by a) input from a supervisory network management system, b) data carried along the incoming optical signal or a sub-carrier thereupon, or c) self-contained detection of the condition of the incoming optical signal.

Figure 7:
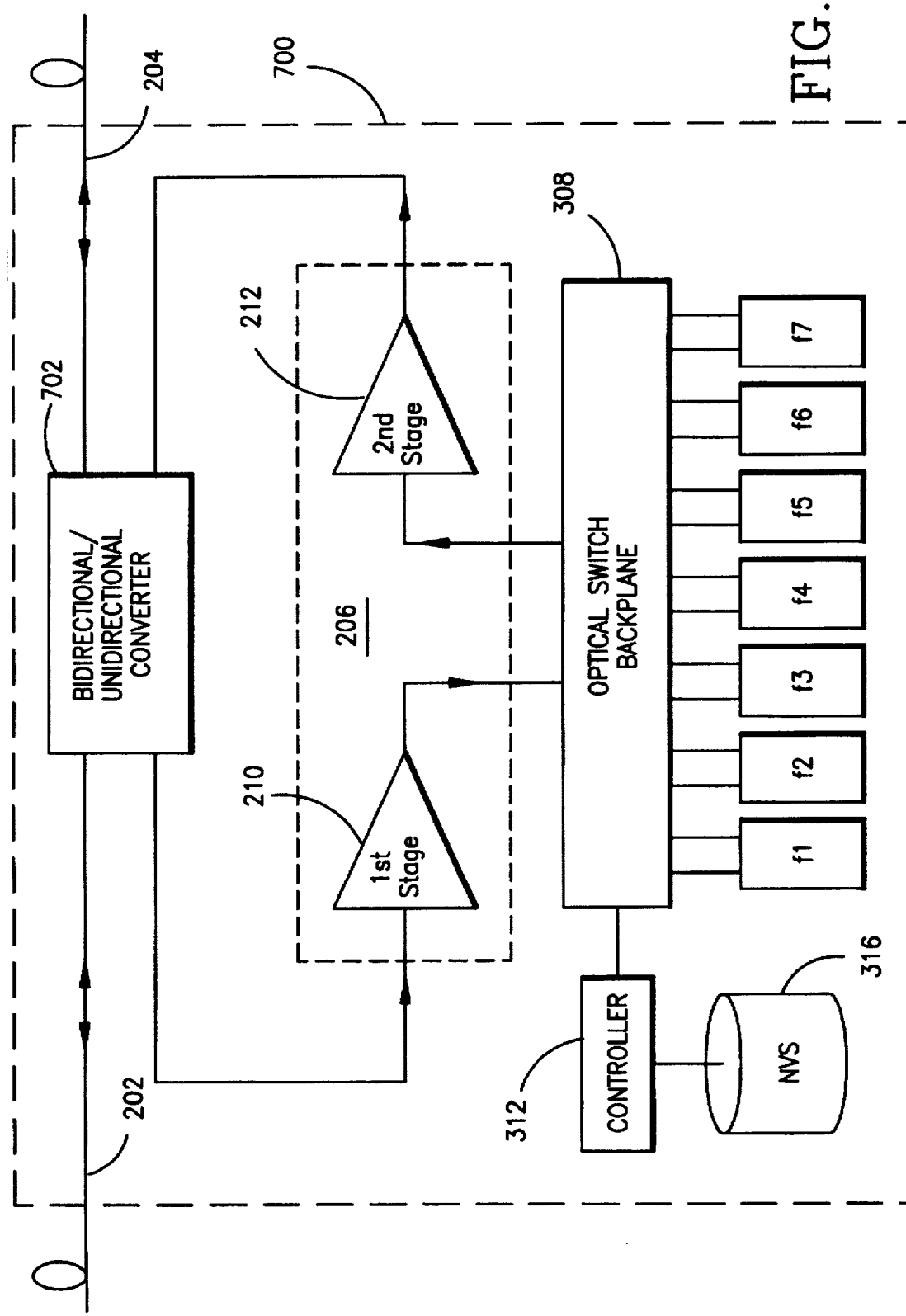
FIG. 7 is a block diagram of the intelligent optical device incorporating a uni/bidirectional converter in accordance with another embodiment of the present invention.

Another embodiment of the present invention is shown in FIG. 7, where the elements depicted in this figure correspond to the like-referenced elements in FIG. 3. The operation of optical interface device 700 in this embodiment is substantially similar to the embodiment of FIG. 3, except that Bidirectional/Unidirectional Converter 702 is provided in addition to other elements previously described in connection with FIG. 3. While Converter 702 may be external to the optical interface device, it may also exist as another functional module that plugs into the shelf cabinet. Unidirectional/Bidirectional Converter 702 is connected between the first stage 210 and second stage 212 of amplifier 206 and between links 202 and 204, as shown in FIG. 7. Converter 702 extracts and blends counter-propagating optical signals such that a two-way path is established along links 202, 204.

Currently available installed equipment for optical amplification and regeneration can only handle a single, fixed type optical signal and is not readily reconfigurable, especially from a remote location. Furthermore, the current equipment has no controlling intelligence to decide how to alter its optical functionality to accommodate a variety of optical signals or to accomplish network reconfiguration.

The present invention fills the need for an agile, all-optical regenerative device to be inserted along a fiber link. The flexibility and intelligent control aspects of the present invention are essential to deployment of an all optical network. The present invention is especially useful in the non-homogeneous environment that will remain in this field throughout the foreseeable future.

Furthermore, in an optical path using an all-optical reshaper, there is a need to either notify a supervisory controller of limitations in signal handling, give advanced notice to a frequency-agile reshaper so that it may prepare to handle an incoming signal, or to perform the switching among multiple reshaper modules that cover different ranges of signals. The present invention easily handles the above processes due to its flexible reconfiguration ability.

Since those skilled in the art can modify the disclosed specific embodiment without departing from the spirit of the invention, it is, therefore, intended that the claims be interpreted to cover such modifications and equivalents.

What is claimed is:

1. An optical interface device for dynamically reconfiguring a telecommunications network, comprising:

an optical amplifier including two stages for amplifying an information carrying optical signal in a communications conduit within said telecommunications network;

an optical switch backplane communicatively coupled between said two stages and including a plurality of optical ports through which said signal is selectively passed;

at least one processing function connected via said plurality of ports to said optical switch backplane for receiving said signal and transmitting said signal to said optical switch backplane after a predetermined processing operation; and a controller, including a microprocessor, electrically connected to said optical switch backplane for controlling via electrical signals said processing operation of said function.

2. The device according to claim 1, further comprising a non-volatile storage device connected to said controller for storing routing logic computer program instructions used by said controller, wherein said instructions are accessed by said controller if a power is interrupted thereto.

3. The device according to claim 1, wherein said optical switch backplane comprises at least one-by-two switching unit having one input port and two output ports for selectively routing said signal from said input port to any of said two output ports.

4. The device according to claim 3, wherein said one-by-two switching unit is cascaded with at least one other one-by-two switching unit for providing a multiple input/ multiple output switching unit to selectively route said signal among said processing functions.

5. The device according to claim 1, further comprising a converter optically connected to said two stages of said optical amplifier for converting a unidirectional signal path to a bidirectional signal path.

6. The device according to claim 1, further comprising a centralized network control center connected to said controller for providing routing logic instructions, wherein said controller controls the processing of said signal by said functions based on said instructions.

7. A method for dynamically reconfiguring a telecommunications network using an optical interface device, comprising the steps of:

amplifying an information carrying optical signal in a communications conduit within said telecommunications network using an optical amplifier which includes two stages;

communicatively coupling an optical switch backplane between said two stages, said optical switch backplane including a plurality of optical ports through which said signal is selectively passed;

connecting at least one processing function via said plurality of ports to said optical switch backplane to receive said signal and transmit said signal to said optical switch backplane after a predetermined processing operation; and electrically connecting a controller, including a microprocessor, to said optical switch backplane to control via electrical signals said processing operation of said function.

8. The method according to claim 7, further comprising the step of storing routing logic computer program instructions used by said controller in a non-volatile storage device, and accessing said instructions by said controller if a power is interrupted thereto.

9. The method according to claim 7, further comprising the steps of cascading in said optical switch backplane a one-by-two switching unit, having one input port and two output ports to selectively route said signal from said input port to any of said two output ports, with at least one other one-by-two switching unit to provide a multiple input/ multiple output switching unit and selectively routing said signal among said processing functions.

10. The method according to claim 7, further comprising the steps of optically connecting a converter to said two stages of said optical amplifier and converting a unidirectional signal path to a bidirectional signal path.

11. The method according to claim 7, further comprising the steps of connecting a centralized network control center to said controller to provide routing logic instructions, and controlling the processing of said signal by said functions based on said instructions.

* * * * *